(12) United States Patent
Desmond et al.

(10) Patent No.: US 7,995,487 B2
(45) Date of Patent: Aug. 9, 2011

(54) INTELLIGENT ROUTER FOR WIRELESS SENSOR NETWORK

(75) Inventors: Leonard Desmond, Fairport, NY (US);
Lance Lascari, Rochester, NY (US);
Scott Wager, Canandaigua, NY (US);
Pat Parker, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 12/396,545

(22) Filed: Mar. 3, 2009

(65) Prior Publication Data
US 2010/0226259 A1    Sep. 9, 2010

(51) Int. Cl.
*G06F 11/00* (2006.01)
(52) U.S. Cl. .......... 370/243; 370/242; 370/279; 709/224
(58) Field of Classification Search .................. None
See application file for complete search history.

(56) References Cited

U.S. PATENT DOCUMENTS

| | | | |
|---|---|---|---|
| 6,694,469 | B1 | 2/2004 | Jalali et al. |
| 6,987,727 | B2 | 1/2006 | Fredette et al. |
| 7,373,563 | B2 | 5/2008 | Noy et al. |
| 7,567,174 | B2 * | 7/2009 | Woodard et al. ......... 340/539.26 |
| 7,689,230 | B2 * | 3/2010 | Spadafora et al. ......... 455/456.1 |
| 2002/0093954 | A1 | 7/2002 | Weil et al. |
| 2002/0137458 | A1 * | 9/2002 | Talwalkar et al. .............. 455/15 |
| 2005/0176368 | A1 * | 8/2005 | Young et al. ................. 455/11.1 |
| 2005/0265228 | A1 | 12/2005 | Fredette et al. |
| 2006/0256740 | A1 | 11/2006 | Koski |
| 2006/0256768 | A1 | 11/2006 | Chan |
| 2007/0066239 | A1 * | 3/2007 | Hart .............................. 455/69 |
| 2007/0190933 | A1 * | 8/2007 | Zheng et al. ..................... 455/7 |
| 2007/0239862 | A1 | 10/2007 | Bronez et al. |
| 2007/0264938 | A1 | 11/2007 | Srinivasan et al. |
| 2008/0049718 | A1 * | 2/2008 | Chindapol et al. ............ 370/351 |
| 2008/0056173 | A1 * | 3/2008 | Watanabe ..................... 370/315 |
| 2008/0058018 | A1 * | 3/2008 | Scheinert ................... 455/562.1 |
| 2008/0109693 | A1 | 5/2008 | Maas et al. |
| 2010/0097976 | A1 * | 4/2010 | Agrawal et al. .............. 370/315 |

FOREIGN PATENT DOCUMENTS

WO    2007079085    7/2007

OTHER PUBLICATIONS

Balakrishnan, H. et al., "Improving TCP/IP Performance over Wireless Networks" Mobicom. Proceedings of the Annual International Conference on Mobile Computing and Networking, Nov. 13, 1995, pp. 1-10.

Braun, T. et al. "TCP Support for Sensor Networks" Wireless on Demand Network Systems and Services, 2007, WONS '07, Fourth Annual Conference on, IEEE, PI, Jan. 1, 2007, pp. 162-169. ISBN: 978-1-4244-0860-3.

(Continued)

*Primary Examiner* — Donald L Mills
(74) *Attorney, Agent, or Firm* — Michael Best & Friedrich LLP

(57) ABSTRACT

Routing packets in a wireless security system. The system includes a network hub that wirelessly sends and receives packets, at least one sensor that wirelessly sends and receives packets to and from the network hub, and a packet router that monitors the packet communications between the network hub and the at least one sensor. The packet router determines when a communication failure occurs, and the packet router is configured to send a first message packet to the network hub if a first type of communication failure occurs and a second message packet to the at least one sensor if a second type of communication failure occurs.

14 Claims, 6 Drawing Sheets

OTHER PUBLICATIONS

Dunkels, A. et al. "Distributed TCP Caching for Wireless Sensor Networks" Proceedings of the 3rd Annual Mediterranean Ad-hoc Networks Workshop [Online], Jan. 1, 2004, pp. 1-11. Retrieved from the Internet: URL: http://www.sics.se/{thiemo/medHoc2004.pdf.

Extended European Search Report, European Patent Application No. 10002096.5, dated Oct. 28, 2010.

* cited by examiner

INTELLIGENT ROUTER FOR WIRELESS SENSOR NETWORK

BACKGROUND

The present invention relates to wireless sensor networks, and more particularly, to wireless sensor networks used, for example, in security systems with improved communication reliability.

Some wireless networks experience communication failures due to transient external factors. For example, in a network of wireless sensors, a loss of connectivity between the sensors or devices can be caused by phenomena such as multipath fading, structural interference (such as that caused by a wall, building, or other object), and the like.

SUMMARY

While wireless systems have drawbacks such as a loss of connectivity due to interference, such networks do have advantages. One of the advantages is that a wireless network may be implemented without the need to route wire between the devices. It is useful to implement building and home security systems using wireless communications, in part, to avoid the need to route wire throughout a building. However, a loss of connectivity in a security system results in a loss of protection. Thus, a high-quality wireless security system should include a mechanism to help reduce or respond to a loss of connectivity. Connectivity problems can be addressed by using repeater networks or mesh networks. One drawback of these types of networks is that they require a relatively large amount of energy and increase the number of messages that are sent to achieve a desired communication. As a consequence, it is desirable to provide an alternative method of ensuring connectivity and functionality that is both energy- and message-efficient.

In one construction, the invention provides a system for routing packets in a wireless security system. The system includes a network hub that wirelessly sends and receives packets, at least one sensor that wirelessly sends and receives packets to and from the network hub, and a packet router that monitors the packet communications between the network hub and the at least one sensor. The packet router determines when a communication failure occurs, and the packet router is configured to send a first message packet to the network hub if a first type of communication failure occurs. In one embodiment, the first type of communication failure is a failed packet delivery from the sensor to the system hub. The router is also configured to send a second message packet to the at least one sensor if a second type of communication failure occurs. In one embodiment, the second type of communication failure is a failed packet delivery from the system hub to the sensor.

In another construction, the invention provides a method of routing packets in a wireless security system. The method includes monitoring packet communications between a first device and a second device, detecting a failed communication of a first message packet, identifying one of the first device and the second device as a receiving device intended to receive the first message packet, and transmitting a second message packet to the receiving device.

In yet another construction, the invention provides a method for routing packets in a wireless security system. The method includes monitoring packet communications between a plurality of devices, detecting a failed communication of a message packet, identifying a first device responsible for sending the message packet, identifying a second device intended to receive the message packet, and assisting the communication between the first device and the second device.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
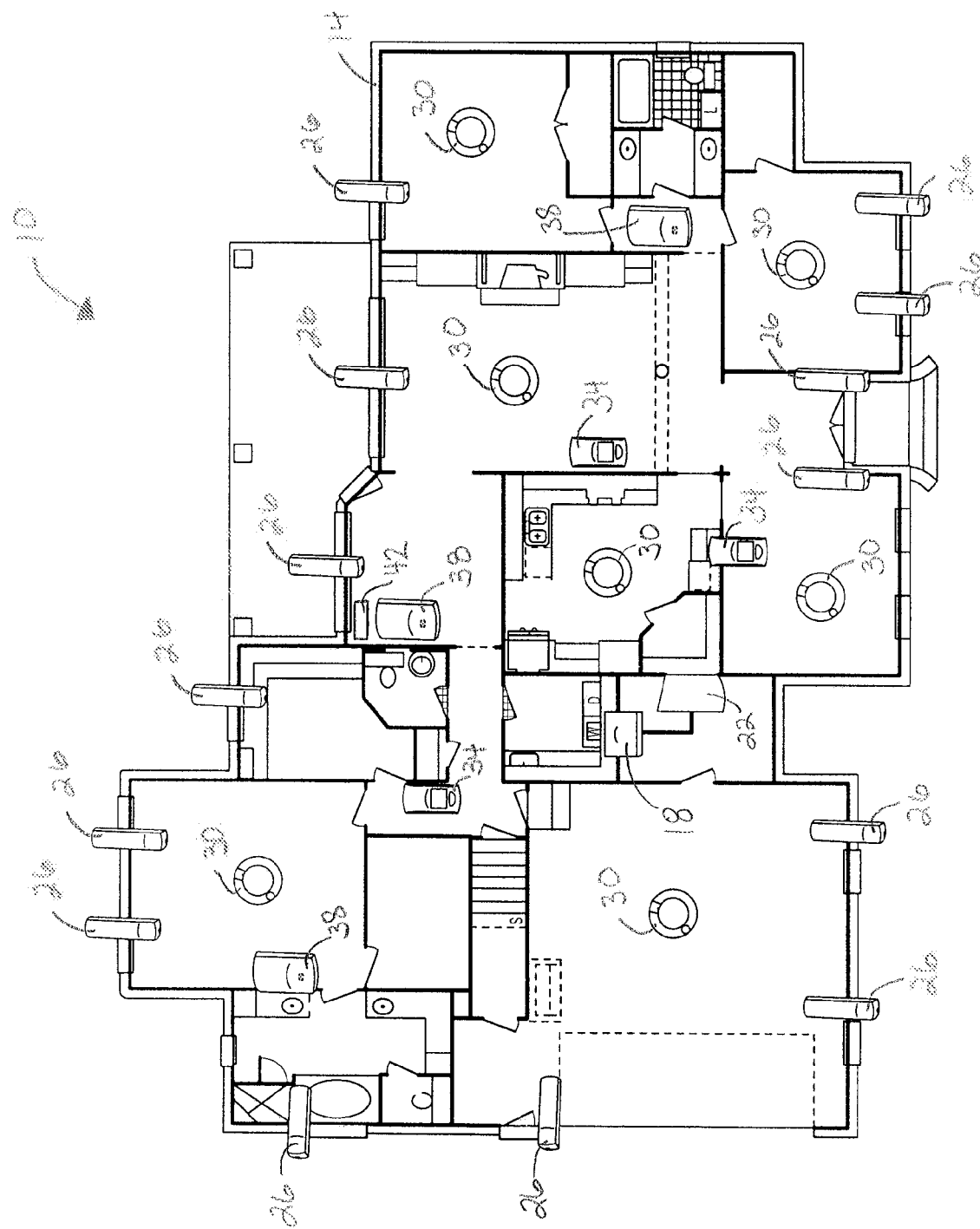
FIG. 1A illustrates a security system installed in a building that includes a network hub, a control panel, a plurality of sensors, a plurality of alarm annunciators, and at least one packet router.

FIG. 1A illustrates a wireless security system 10 in a building 14. The security system 10 includes a network hub 18, a control panel 22, a plurality of sensors 26, 30, and 34, at least one alarm annunciator 38, and at least one intelligent packet router 42. The network hub 18 is typically installed in a central location in a building 14 and is configured to wirelessly communicate with the plurality of sensors 26, 30, and 34. The network hub 18 is connected to a control panel 22. A user may enter information, perform diagnostics, or perform other functions by using the control panel 22 to communicate with the security system 10.

Wireless communication in the security system 10 is achieved through the wireless transmission of packets on designated radio-frequency (RF) channels according to a defined network protocol such as the BOSCH wLSN protocol or others which may employ single frequency, frequency hopping, TDMA, or synchronous time slotting for point-to-point and point-to-multipoint communications that defines the operation of the security system 10. Packets, sometimes referred to as message packets, are groups of bits or characters that typically contain a preamble, a start word, payload data, and an error check. The payload data may be divided into a device ID, a message type, and message specific data. Some message types include alarm messages, acknowledgement messages, and control messages. Of course, other network protocols may use a different number of message types or may use different message types.

In the illustrated construction, the wireless security system 10 includes various types of sensors including contact sensors 26, smoke sensors 30, and motion sensors 34. The sensors 26, 30, and 34 are configured to send and receive packets and are typically dispersed throughout the building within wireless range of the network hub 18. The contact sensors 26 are configured to detect when contact is broken (e.g., opening of a door or window) and emit an alarm message packet in response. Similarly, smoke sensors 30 emit an alarm message packet when they detect smoke, and motion sensors 34 emit an alarm message packet when they detect motion. Typically, the sensors 26, 30, and 34 are powered by batteries or similar power sources because they do not require sustained power for long periods of time. In other constructions, the sensors 26, 30, and 34 may be connected to the power supply for the building 14. In yet other constructions, additional sensors may be employed (e.g., carbon monoxide sensors, vibration sensors, temperature sensors, position sensors etc.) or only one type of sensor may be employed.

The alarm annunciators 38 are located throughout the building and are configured to send and receive packets. For example, an annunciator 38 may receive a packet from the network hub 18, process the information, and emit a sound as an alarm. Typically, the annunciators 38 are connected to the power supply for the building 14 because enough power should be available to maintain the annunciation for an unknown period of time.

The packet router 42 monitors the communications between devices in the system 10. The packet router 42 is configured to assist the communication, as described with respect to FIGS. 2-4 when a failed communication is detected.

Figure 1B:
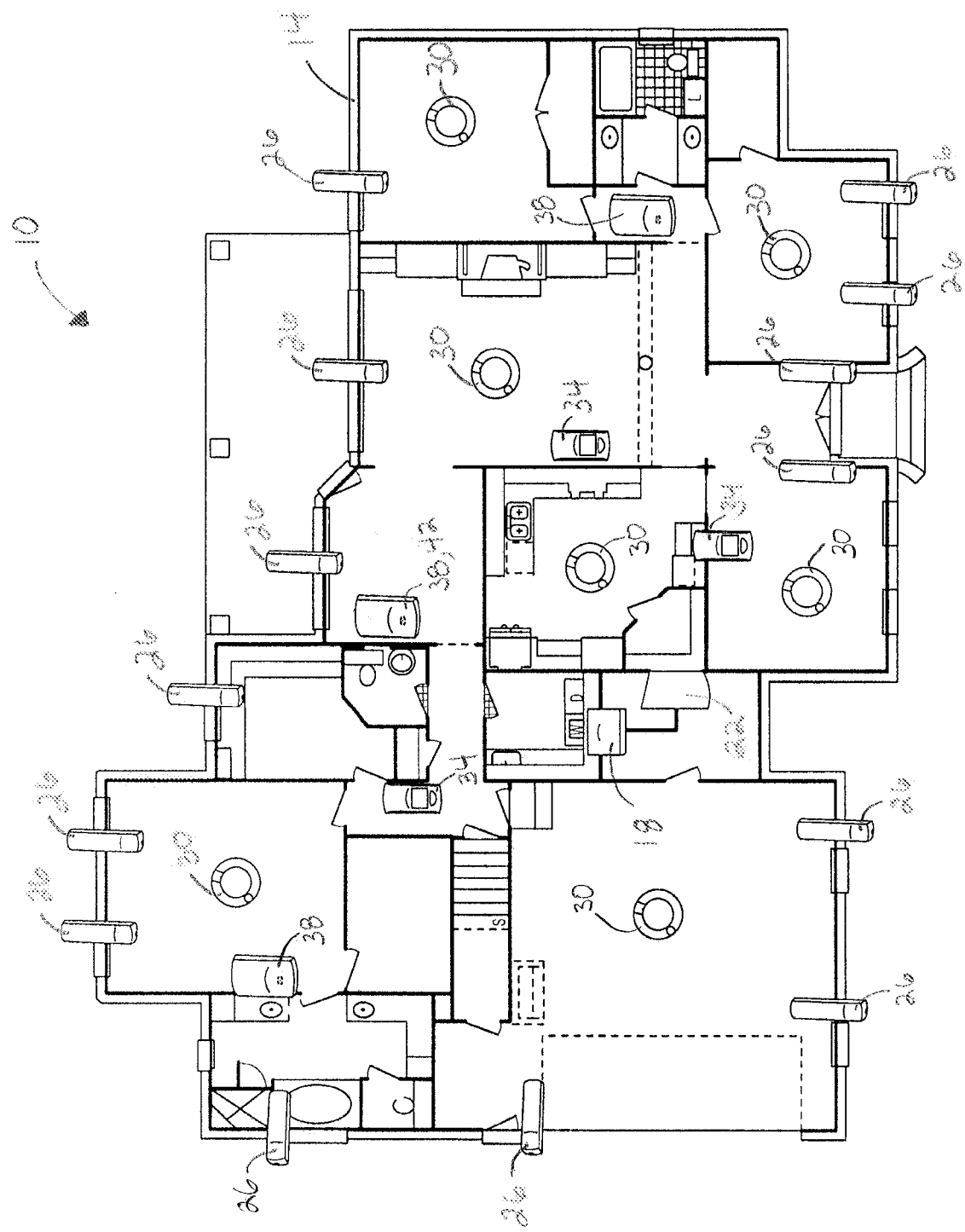
FIG. 1B illustrates a second embodiment of a security system installed in a building that includes a network hub, a control panel, a plurality of sensors, and a plurality of alarm annunciators, with one annunciator configured to operate as a packet router.

FIG. 1B illustrates a second embodiment of the invention in which one of the annunciators 38 has a dual-functionality. In addition to producing alarms, the annunciator 38 is also configured as a packet router 42. Other devices (e.g., sensors, network hub 18, external devices, etc.) in the system 10 could also be configured to act as packet routers 42.

Figure 2:
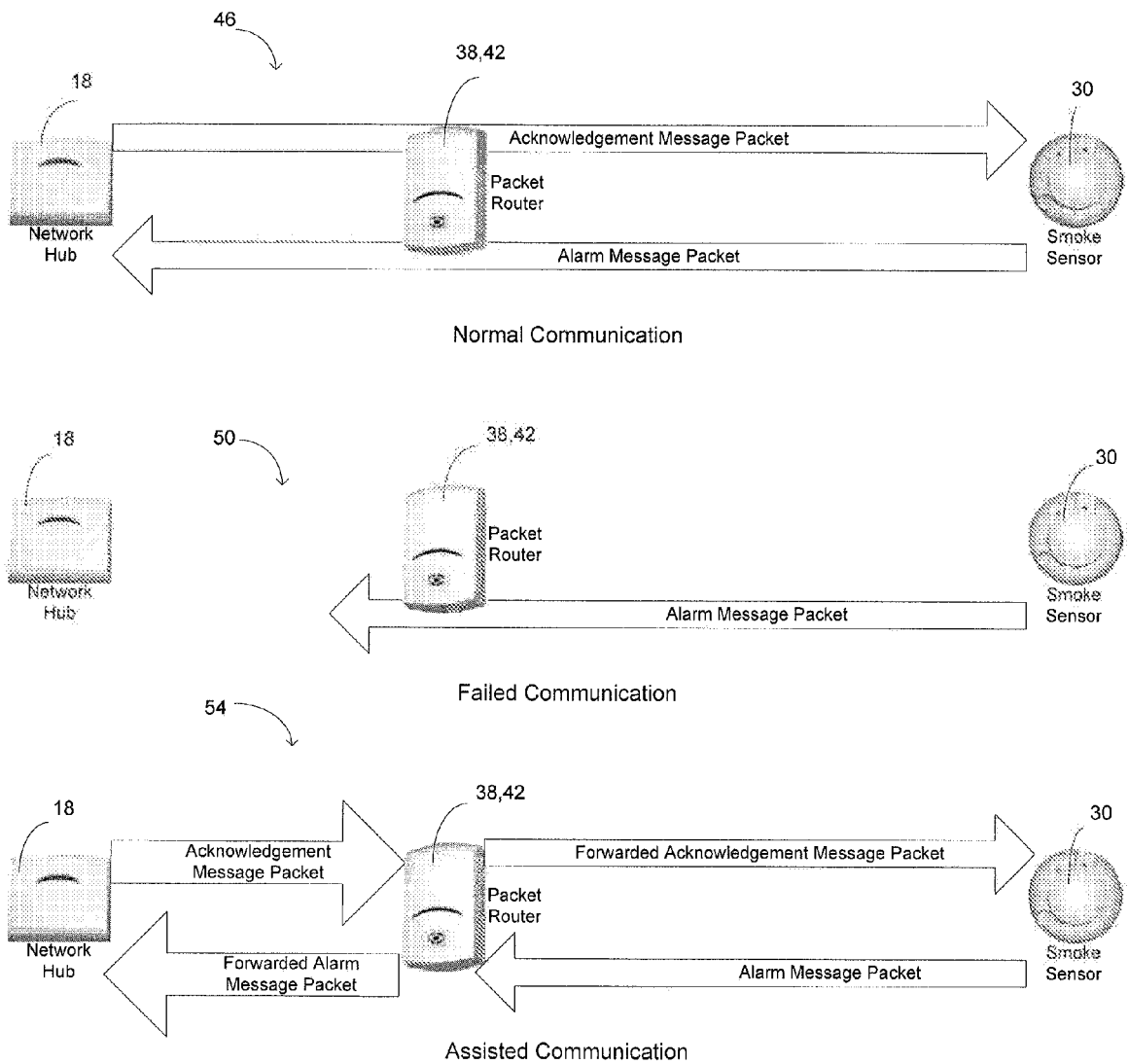
FIG. 2 illustrates an example of communication that occurs between a wireless sensor and the network hub.

FIG. 2 illustrates the communication that may occur between two devices. For example, communication between the network hub 18 and a wireless sensor 30 is illustrated. During normal operation 46, the wireless sensor 30 may send an alarm message packet to the network hub 18. The network hub 18 receives the alarm message packet, processes it, and sends an acknowledgement message packet back to the wireless sensor 30. The packet router 42 monitors the communications but takes no other action during normal operation.

In some instances, a communication failure may occur. The failed communication may be caused by phenomena such as multipath fading, structural interference (such as that caused by a wall, building, or other object), and the like. The wireless sensor 30 is configured to send a message packet to the network hub 18 and wait for an acknowledgement message packet from the network hub 18. If a certain amount of time passes and the wireless sensor 30 does not receive an acknowledgement message packet, the wireless sensor 30 will perform a retry or attempt to resend the message packet to the network hub 18. Repeated retries are undesirable because they result in excessive energy consumption by the sending device and any other device that may be listening for the same type of incoming message.

After a certain number of retries, the packet router 42 assumes a communication failure 54 (as described below) between the wireless sensor 30 and the network hub 18. The packet router 42 intercepts the alarm message packet from the wireless sensor 30 and forwards the intercepted alarm message packet to the network hub 18. The network hub 18 receives the forwarded alarm message packet, processes it, and transmits an acknowledgement message packet back to the wireless sensor 30. The acknowledgement message packet may be received by the packet router 42 and forwarded by the packet router 42 to the wireless sensor 30, thus completing the message transaction, in a manner transparent to the network hub 18 and wireless sensor 30.

In other embodiments, the packet router 42 may assist the communication in a different way. For example, the packet router 42 may intercept the alarm message packet from the wireless sensor 30 and send an acknowledgement message packet to wireless sensor 30, allowing the sensor 30 to take appropriate action (e.g., the cessation of re-sending of the alarm message packet). The packet router 42 may then forward the intercepted alarm message packet to the network hub 18, as if the packet router 42 was the initiating wireless sensor 30. The network hub 18 receives the forwarded alarm message packet, processes it as if it came directly from the wireless sensor 30, and transmits an acknowledgement message packet that is intended for the wireless sensor 30 but is intercepted by the packet router 42, thus completing the message transaction, in a manner transparent to the network hub 18 and wireless sensor 30.

The assisted packet communications may be considered transparent to the network hub 18 and the wireless sensor 30 because the forwarded packets contain data that is substantially equal to the original packet data. For example, the packet router 42 does not insert, delete, or otherwise modify packets. Thus, the network hub 18 and the wireless sensor 30 do not require any additional software that is designed to handle different types of packets (e.g., packets that contain a different data format than expected in the current system). The network hub 18 processes messages received from the packet router 42 in the same manner as the network hub 18 processes messages received directly from the wireless sensor 30. Similarly, the wireless sensor 30 processes packets received from the packet router 42 in the same manner as the wireless sensor 30 processes packets from the network hub 18. Thus, one advantage of the illustrated embodiment is that a packet router 42 according to the first embodiment may be implemented in almost any preexisting wireless communication system without a requirement for adding additional software to any of the devices not designated as packet routers and without making modifications to preexisting databases.

Figure 3:
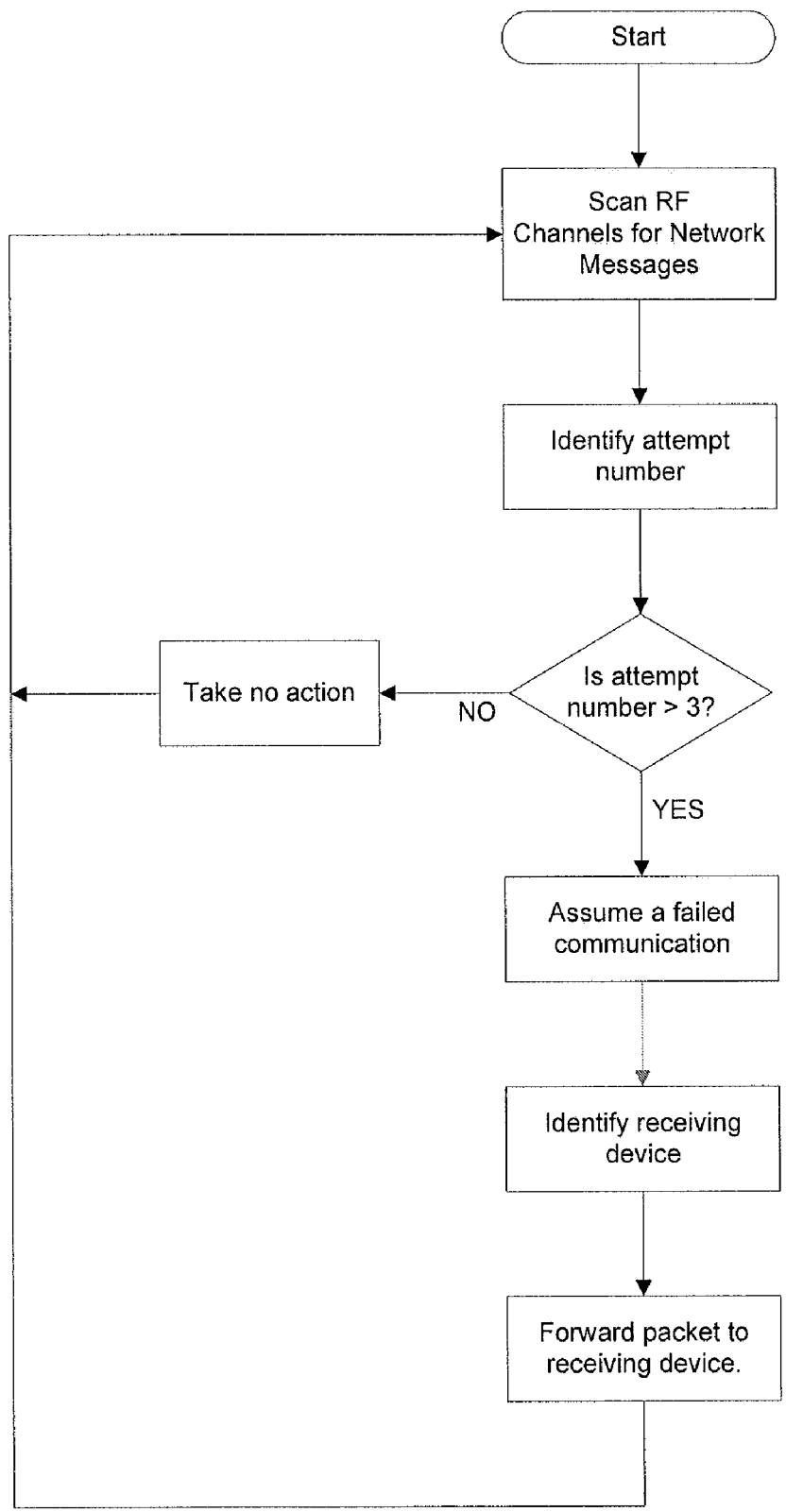
FIG. 3 is a flowchart that illustrates an example of the logic used by a packet router in the security system of FIG. 1.
Figure 4:
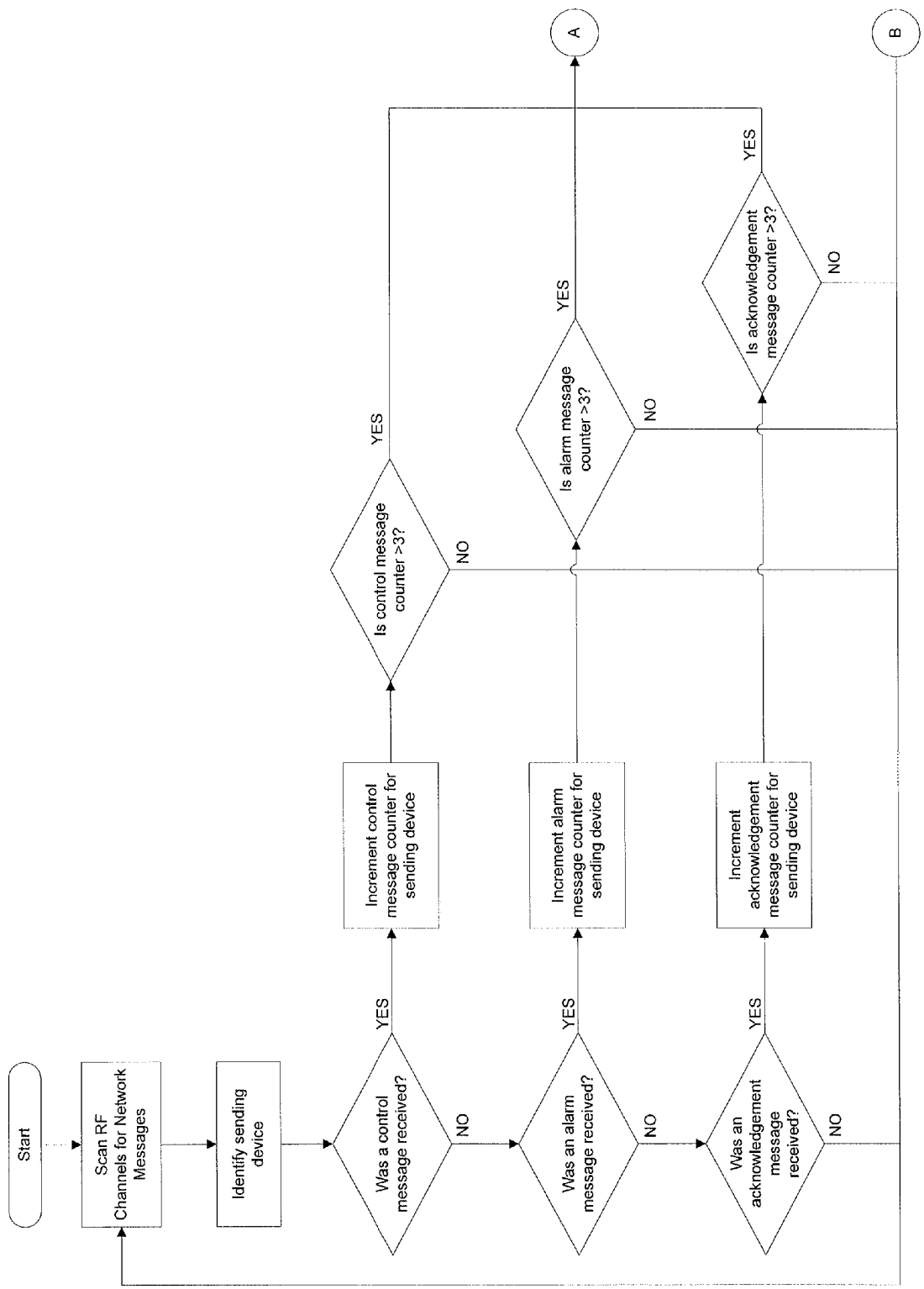
FIG. 4 is a flowchart that illustrates an example of an alternative logic that may be used by a packet router in the security system of FIG. 1.
Figure 5:
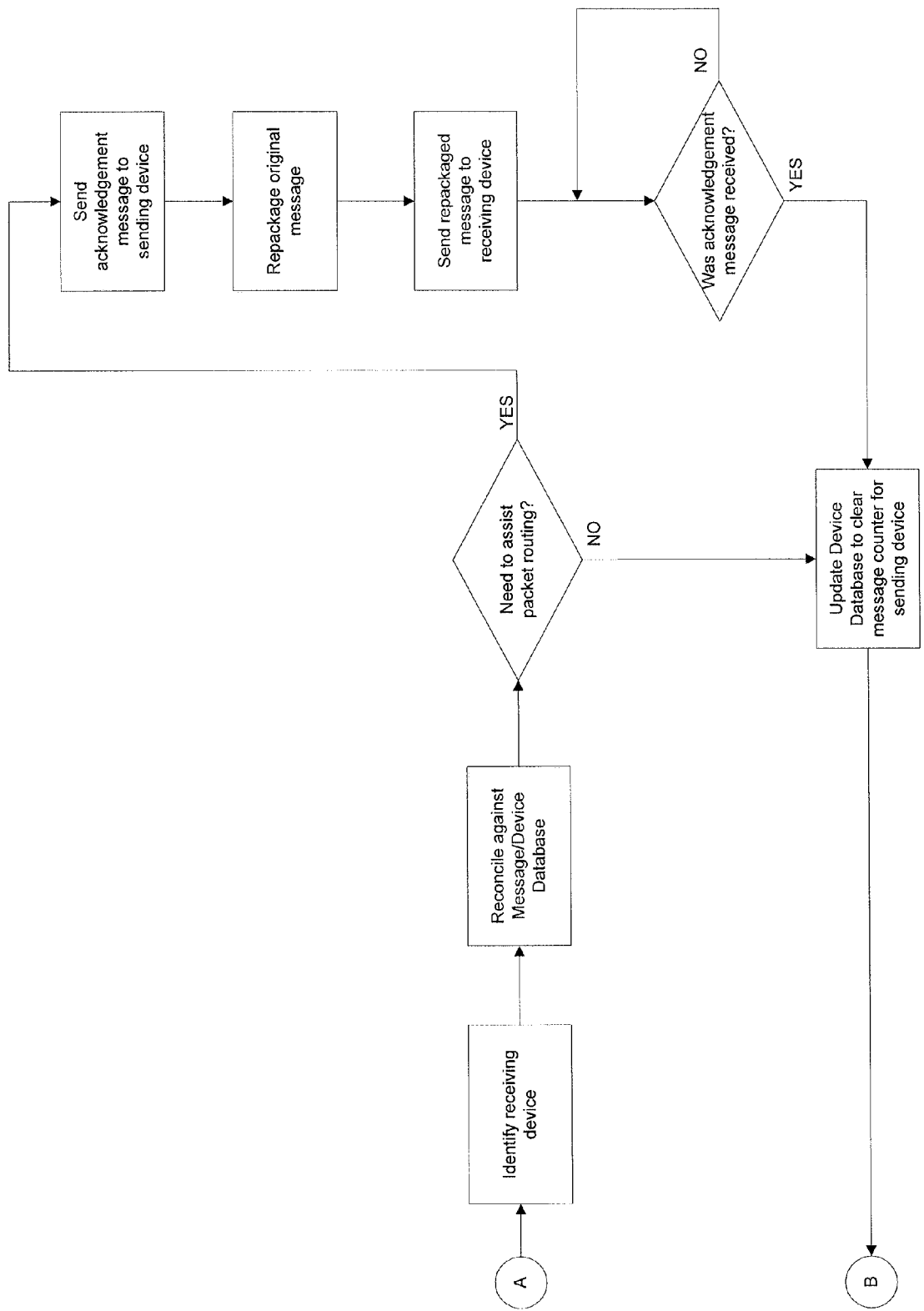
FIG. 5 is a continuation of the flowchart of FIG. 4 that illustrates an example of an alternative logic that may be used by a packet router in the security system of FIG. 1.

FIG. 3 illustrates one example of logic that may be employed by the packet router 42. The packet router 42 monitors the RF channels for network messages or packets. When a packet is detected by the packet router 42, the packet router 42 processes the information to identify the attempt number (i.e., the number of times the message has been sent) of the packet. If the attempt number is greater than a threshold value (e.g., three), the packet router 42 assumes a failed communication. Although the communication failure is assumed when the attempt number is greater than a predetermined threshold, it is possible that the communication did not fail. Thus, it is possible that the packet router 42 may incorrectly assume a failed communication. However, if the packet router 42 forwards the message packet, no negative actions will result because the wireless devices include processing or functionality to account for the receipt of repeated message packets. In some embodiments, the threshold value may be higher or lower than three. For example, the threshold may be increased if the system has ample bandwidth available and the threshold may be decreased if the system has a lot of traffic and little bandwidth available.

After a failed communication is assumed, the packet router 42 identifies the receiving device and forwards the packet to the intended receiving device without substantially modifying or altering the packet. Then, the packet router 42 resumes scanning of the RF channels for network messages or packets.

In a second embodiment of the present invention, the packet routers 42 may process the packets in a different way. As illustrated in the flowchart of FIG. 3, the packet router 42 monitors the RF channels. When a message packet is detected by the packet router 42, the packet router 42 processes the information to identify the sending device and the message type (e.g., control message, alarm message, acknowledgement message, etc.) by having inherent knowledge of the protocol being supported. Some examples of protocol specific information that can be used are message type, time slot, explicit origin, destination addressing, etc.

The packet router 42 has access to a Message/Device Database containing information such as the identification codes for each device in the security system 10, definitions of the message types, device-specific instructions, message-specific instructions, etc. The Message/Device Database may also contain information regarding the network protocol (e.g., alternate network channels, pre-defined sub slots in a Time Division Multiple Access (TDMA) protocol implementation, etc.). In some protocols, the sending and receiving device IDs are located within each packet. In other protocols, only the sending device is located within each packet. For example, in star networks, a central device sends and receives messages from all other devices in the network. The devices (e.g., sensors) only send messages to the central device. Thus, the device ID located in the packets corresponds to the sending device, and the receiving device is defined to be the central hub. When an acknowledgement packet is sent from the central device to the sending device, time slotting may be used to determine the recipient. For example, after the central device receives a message packet, a certain period of time is defined by the protocol during which an acknowledgement message packet is sent back to the sending device and no other communications are allowed. In this way, the intended receiver is defined by the time slot in which the message is sent.

After the packet router 42 identifies the message type and sending device, the packet router 42 may increment a message counter or tag the message in a manner allowing tracking and temporary persistence. For example, if the packet router 42 detects a message packet, the packet router 42 increments the message counter that corresponds to the identified sending device. After the message counter is incremented, the packet router 42 compares the value of the message counter to a pre-defined threshold. In the illustrated construction, the message counter is compared to a threshold of three such that when the message counter is greater than three, the packet router 42 takes further action (see FIG. 4) and when the message counter is less than or equal to three, the packet router 42 takes no action and continues to scan the RF channels. In some embodiments, the threshold for the message counters is higher or lower than three.

When the value of the message counter is greater than three, the packet router 42 looks up the sending device identification and message in the Message/Device Database to determine whether it should assist packet routing. For example, if the message is an alarm message sent from a wireless sensor 30 to the network hub 18, the packet router 42 determines that assistance should be provided to ensure the alarm message is received by the network hub 18. In other instances, the Message/Device Database contains instructions to ignore packets sent by a particular device or to ignore specified messages sent by any device.

After the packet router 42 determines that it should take action, the packet router 42 sends an acknowledgement message packet to the sending device. The acknowledgement message packet contains the same information that would be received from the receiving device and may also include the identification code of the packet router 42. The sending device receives the acknowledgement message packet and interprets it. Thus, the sending device stops trying to resend the original message packet to the receiving device while the packet router 42 assists communication.

The packet router 42 repackages the original message packet into a new message packet (e.g., repackaged message packet) that contains the same in formation as the original message packet and further includes the identification code of the packet router 42. The packet router 42 sends the repackaged message packet to the receiving device, and the receiving device processes the message packet. The receiving device transmits an acknowledgement message packet to the packet router 42 that also contains the identification code of the sending device. The packet router 42 uses this information to determine that the repackaged message packet has been received and no further action is required. The packet router 42 clears the corresponding message counter for the sending device and continues to monitor the RF channels.

In a other embodiments of the present invention, the packet router 42 may operate in a similar manner as the second embodiment. The packet router 42 may be configured to store exact copies of each packet it monitors or reads for comparison with subsequent packets read by the packet router 42. The packet router 42 may track the messages by counting the number of times it reads the same packet. The packet router 42 may interpret two messages as being equal when they exactly match each other, when the payload data is exactly the same, or in response to a comparison of a different portion of the data contained in the packet. When the packet router 42 reads the same message packet multiple times (e.g., three times), it may assume a communication failure has occurred and assist the packet communication using one of the methods described above, or a different method.

In other constructions, the packet router 42 may perform similar actions as discussed above, in a different order. For example, when the packet router 42 determines that it should take action, the packet router 42 may first repackage the original message packet into a new message packet containing the same information and further including the identification code of the packet router 42. The packet router 42 sends the repackaged message packet to the receiving device, where it is received and processed by the receiving device. The receiving device sends an acknowledgement message packet to the packet router 42. The packet router receives the acknowledgement message packet from the receiving device and repackages it into a new acknowledgement message packet (e.g., repackaged acknowledgement message packet). The packet router 42 sends the repackaged acknowledgement message packet to the sending device, where it is processed by the sending device.

As noted above, in some embodiments, multiple devices may be employed to act as packet routers 42. Operation of such systems in which multiple devices act as packet routers 42 is similar to operation of the constructions described above. During the design of the system 10, placement of the packet routers 42 and the number of packet routers 42 acting in the system 10 is considered. For example, if two packet routers 42 are located near each other, the packet routers 42 may be within wireless range of the same devices. Thus, the packet routers 42 may monitor and assist the same communications, resulting in redundancy. For example, if two packet routers 42 detect the same communication failure, each will forward the message packet to the appropriate device, and the receiving device will receive the two forwarded message packets containing the same message. Preferably, a wireless protocol having redundant-packet filtering is used so that one of the redundant messages is discarded or ignored.

In other embodiments, multiple packet routers 42 may be employed that do not monitor the same communications. Each packet router 42 may be assigned to monitor specific RF channels, such that redundancy is substantially decreased.

The packet routers 42, having knowledge of the target network protocol, may take advantage of unused network time, alternate network channels, or pre-defined sub slots in the TDMA protocol implementation when sending repackaged message packets. Implementation of a packet router 42 or a plurality of packet routers 42 in a security system 10 provides more efficient use of network bandwidth, more efficient energy usage, and a simplified software implementation as compared to alternative methods of ensuring connectivity.

Thus, the invention provides, among other things, a system with improved connectivity. Various features and advantages of the invention are set forth in the following claims.

What is claimed is:

1. A wireless security system, the system comprising:
   a network hub that wirelessly sends and receives message packets;
   at least one security sensor that wirelessly sends and receives message packets to and from the network hub; and
   a packet router that monitors packet communications from the network hub to the at least one sensor and from the at least one security sensor to the network hub, the packet router configured to
   determine when a first type of communication failure occurs, the first type of communication failure being a failure of a message packet from the at least one security sensor to be received by the network hub, and send a first message packet that is the same as the message packet from the at least one sensor to the network hub if the first type of communication failure occurs; and
   determine when a second type of communication failure occurs, the second type of communication failure being a failure of a message packet from the network hub to be received by the at least one security sensor, and send a second message packet that is the same as the message packet from the network hub to the at least one security sensor if the second type of communication failure occurs.

2. The system of claim 1, wherein the packet router is further configured to send
   a first acknowledgement packet to the at least one sensor, if the first type of communication failure occurs; and
   a second acknowledgement packet to the network hub, if a second type of communication failure occurs.

3. The system of claim 1, wherein packet router determines when a communication failure occurs by detecting a plurality of failed communications of the packet.

4. The system of claim 1, wherein the packet contains an identification code corresponding to the receiving device.

5. The system of claim 1, wherein the packet router operates transparently within the network and the network hub and the at least one sensor has no knowledge of the packet router.

6. The system of claim 1, wherein the packet router repackages the message to include an identification code of the packet router.

7. The system of claim 1, wherein the network hub and the at least one sensor contain additional software to process message packets that contain the identification code of the packet router.

8. The system of claim 1, wherein the packet router is a first packet router and wherein the system further comprises a second packet router that monitors the packet communications between the network hub and the at least one sensor and determines when a communication failure occurs, the second packet router configured to send
   a third message packet to the network hub if the first communication failure occurs; and
   a fourth message packet to the at least one sensor if the second communication failure occurs.

9. The system of claim 8, wherein the first packet router monitors the packet communication within a first perimeter and the second packet router monitors the packet communication within a second perimeter.

10. The system of claim 9, wherein the first perimeter does not substantially overlap the second perimeter.

11. The system of claim 9, wherein the first perimeter overlaps the second perimeter and wherein the network hub and the at least one sensor are further operable to filter the received packets in response to receipt of receiving the same message from the first packet router and the second packet router.

12. The system of claim 8, wherein the packets are communicated using radio frequency channels.

13. The system of claim 12, wherein the first packet router monitors the packet communications in a first set of specified radio frequency channels and the second packet router monitors the packet communications in a second set of specified radio frequency channels.

14. A method for routing packets in a wireless security system, the method comprising:
   monitoring, with a packet router, packet communications between a plurality of devices;
   detecting, by the packet router, a failed communication of a message packet;
   identifying, by the packet router, a first device responsible for sending the message packet;
   identifying, by the packet router, a second device intended to receive the message packet;
   transmitting, by the packet router, a first acknowledgement packet to the first device, where the first acknowledgment packet is the same as an acknowledgment message packet from the receiving device to the sending device;
   repackaging, by the packet router, the message packet into a second message packet, where the second message packet is the same as a message packet sent from the sending device to the receiving device;
   transmitting, by the packet router, the second message packet to the second device; and
   receiving, by the packet router, a second acknowledgement packet from the receiving device.

* * * * *